May 15, 1928. 1,669,455
F. H. C. COPPUS
SYSTEM OF DRAFTING LOCOMOTIVES IN ROUNDHOUSES
Filed Sept. 14, 1925 7 Sheets-Sheet 2
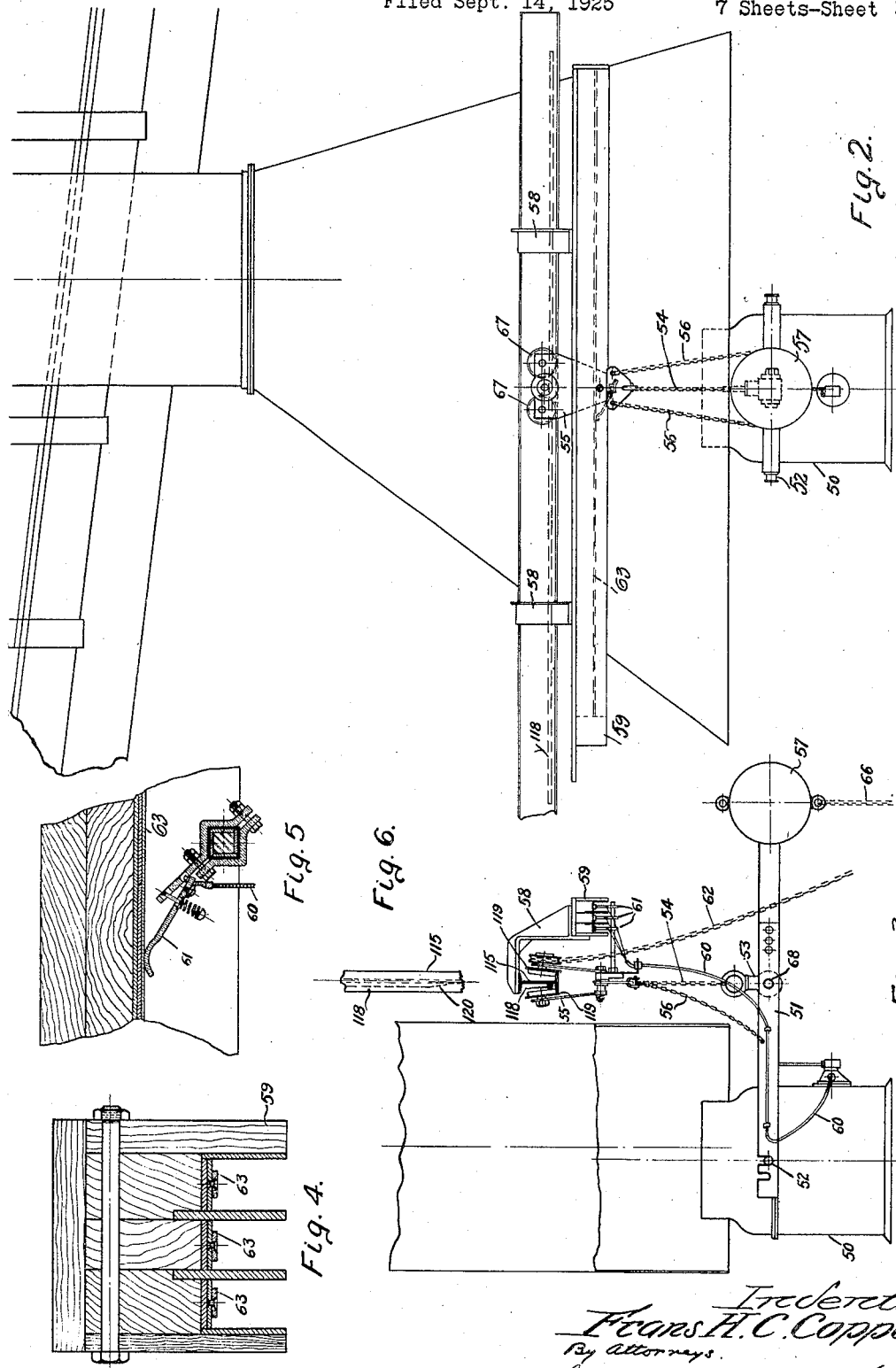

May 15, 1928.

F. H. C. COPPUS 1,669,455

SYSTEM OF DRAFTING LOCOMOTIVES IN ROUNDHOUSES

Filed Sept. 14, 1925   7 Sheets-Sheet 3

Inventor
Frans H. C. Coppus,
By Attorneys.

May 15, 1928.　　　　　　　　　　　　　　　1,669,455
F. H. C. COPPUS
SYSTEM OF DRAFTING LOCOMOTIVES IN ROUNDHOUSES
Filed Sept. 14, 1925　　　7 Sheets-Sheet 4
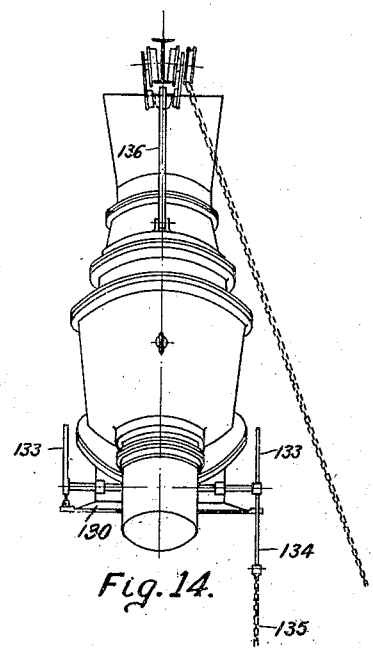
Fig. 14.
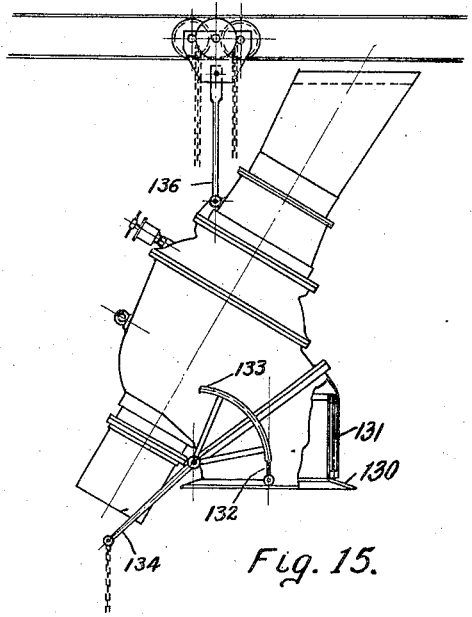
Fig. 15.
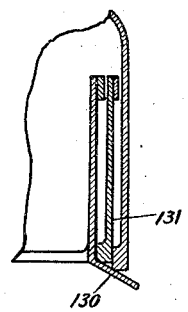
Fig. 16.
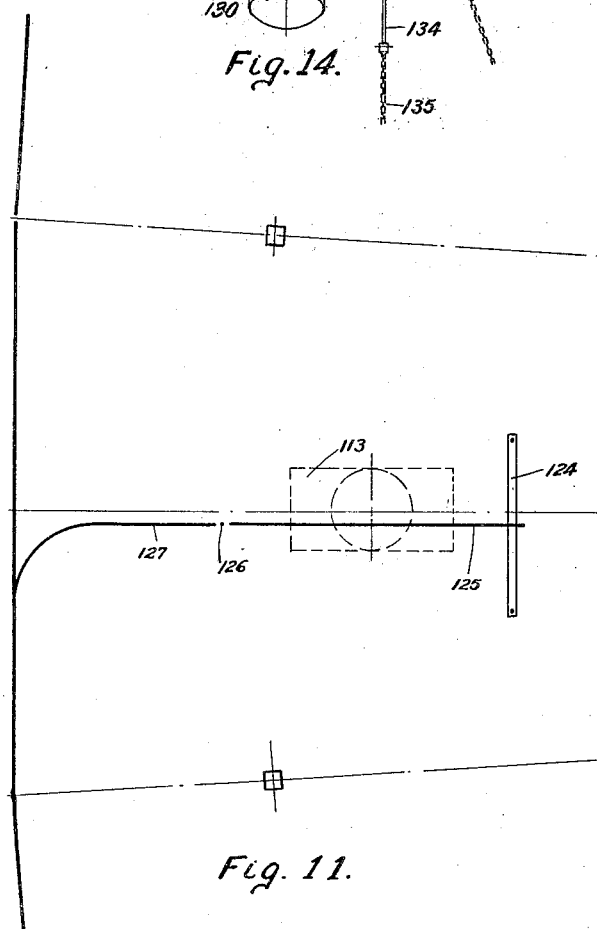
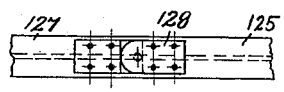
Fig. 12.
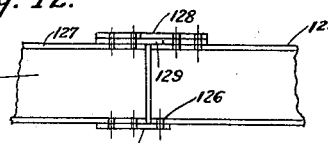
Fig. 13.
Fig. 11.
Inventor:
Frans H. C. Coppus.
By Attorneys

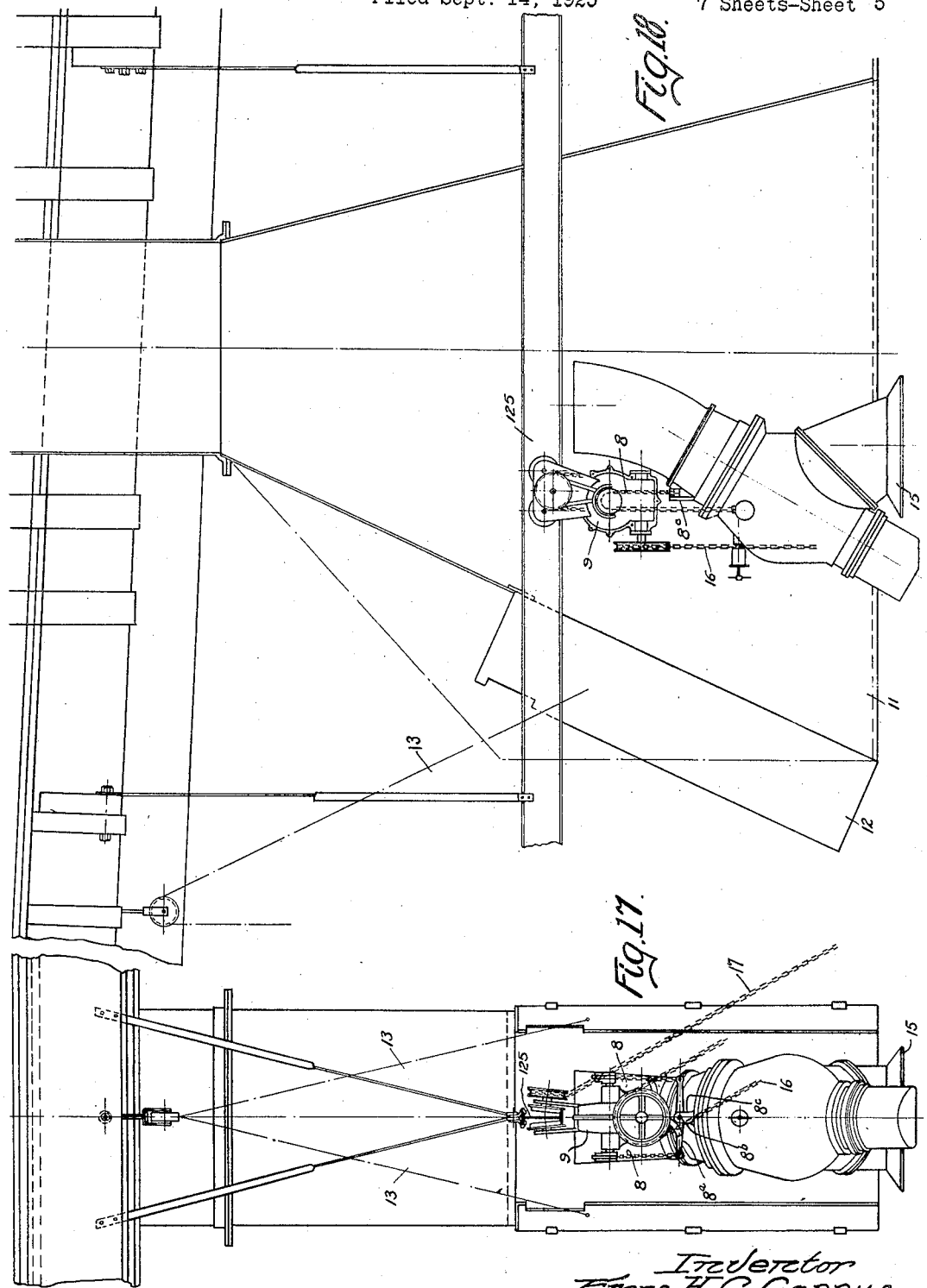

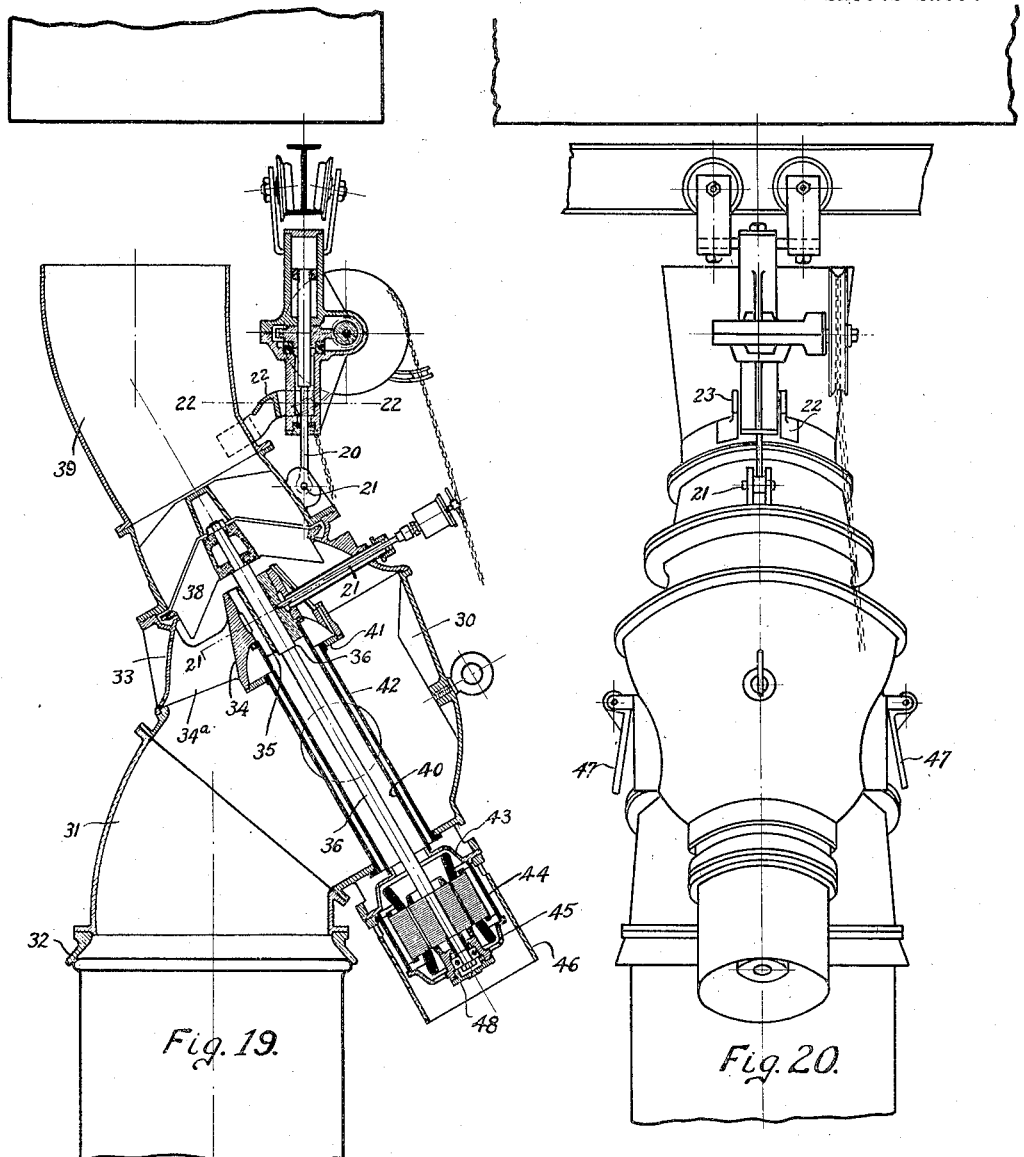

May 15, 1928. 1,669,455

F. H. C. COPPUS

SYSTEM OF DRAFTING LOCOMOTIVES IN ROUNDHOUSES

Filed Sept. 14, 1925    7 Sheets-Sheet 7

Inventor
Frans H. C. Coppus
By attorneys

Patented May 15, 1928.

1,669,455

REISSUED

UNITED STATES PATENT OFFICE.

FRANS H. C. COPPUS, OF WORCESTER, MASSACHUSETTS, ASSIGNOR TO ANNA M. C. WECHSBERG, VERA L. WOOD, AND FRANS H. C. COPPUS, TRUSTEES.

SYSTEM OF DRAFTING LOCOMOTIVES IN ROUNDHOUSES.

Application filed September 14, 1925. Serial No. 56,113.

This invention relates to drafting of locomotives in roundhouses during the firing up period, but it is capable of general use particularly certain parts of it.

The principal objects of the invention are to eliminate the usual steam pipe with which roundhouses are now provided; to substitute for it electrical mechanism which will be shut off automatically when the blowers are removed, thus saving power; to provide means for drafting locomotives in the different stalls of a roundhouse or any other place where locomotives may be drafted such as repair sheds, railroad yards, sidings, etc. by a portable blower to be attached to or placed on the stack of a locomotive and to discharge the gases of combustion into the smoke jack or uptake through the roof of the roundhouse or into a stack or chimney, or directly into the open atmosphere; to provide a blower driven by a motor to handle the gases of combustion and to provide means for cooling the motor during its operation; to provide means for quickly transferring this blower from one locomotive to another; to provide the blower with a suitable support to place it on the stack of the locomotive regardless of the position of the locomotive in relation to the smoke jack or gas uptake; to provide means for connecting the blower with the top of the smoke jack regardless of the tilting of the locomotive; to provide means for automatically starting and stopping the blower when it is placed within close proximity of the locomotive stack or taken away from the locomotive stack; to provide supporting means for the blower in case the locomotive should be backed out of the roundhouse while the blower is on the stack of the locomotive; to provide means to protect the motor against the gases of combustion and also against any discharge by the steam of the locomotive steam jet blower if this should be turned on while the blower is on the stack; to provide means for fitting the blower on different sizes and heights of locomotive stacks; and to provide automatic means for lubricating the bearings of the blower.

Reference is to be had to the accompanying drawings in which

Fig. 2 is a side view of one of the smoke jacks with a preferred embodiment of this invention shown connected therewith;

Fig. 3 is an end view of the same;

Fig. 4 is a transverse sectional view on an enlarged scale showing electrical connections and the like;

Fig. 5 is a sectional view at right angles to Fig. 4 showing the sliding connection for the electric current;

Fig. 6 is a fragmentary plan of the track;

Fig. 11 is a plan similar to Fig. 1 showing modifications;

Figs. 12 and 13 are a plan and side view showing a way of providing for the pivotal arrangement of the spur track in Fig. 11;

Figs 14 and 15 are end and side views of a modified blower used in Fig. 11;

Fig. 16 is an enlarged sectional view of the adjustable blower intake;

Figs. 17 and 18 are views similar to Figs. 14 and 15 showing another form in which this invention can be carried out;

Figs. 19 and 20 are similar views of another form;

Fig. 21 is an enlarged sectional view on the line 21—21 of Fig. 19;

Fig. 22 is an enlarged sectional view on the line 22—22 of Fig. 19;

Every time the boiler of a locomotive is cleaned and inspected, which is done at least once a month, a new fire must be started in the locomotive, and steam pressure built up. When minor repairs are made in the locomotive fire box, while the locomotive boiler remains under steam pressure, air is induced through the locomotive fire box by creating a draft in the locomotive stack. This is normally done by a steam jet blower with which each locomotive stack is equipped, and usually steam for operating this steam blower is taken from a steam main in the roundhouse. This means that a steam connection must be made through a flexible hose or steam pipes with flexible couplings. This method is very costly and cumbersome. The advantages of a blower system are fully appreciated, but heretofore blower systems have always been of a stationary nature, the stack being connected by flexible or telescoping pipes to the blower intake. The blower then discharges the gases of combustion, or the air induced, through a chimney. This system has been found very costly to maintain, cumbersome in operation, and tending to a waste of power on account of the tendency of the operator to leave the blower intakes open, thereby using needlessly much power.

With my system I provide a small motor driven blower which takes care of one locomotive at a time, but may be used in any one stall of the roundhouse. A number of such blowers may be used side by side or widely scattered over the roundhouse thereby giving the utmost flexibility of operation. For this purpose I provide a monorail system from one end of the roundhouse to the other, with a spur leading to each stall of the roundhouse, these spurs being connected to the main rail by two way switches. Instead of using a monorail with spurs each stall or drafting space may, of course, be provided individually with an independent rail or track.

Figure 1:
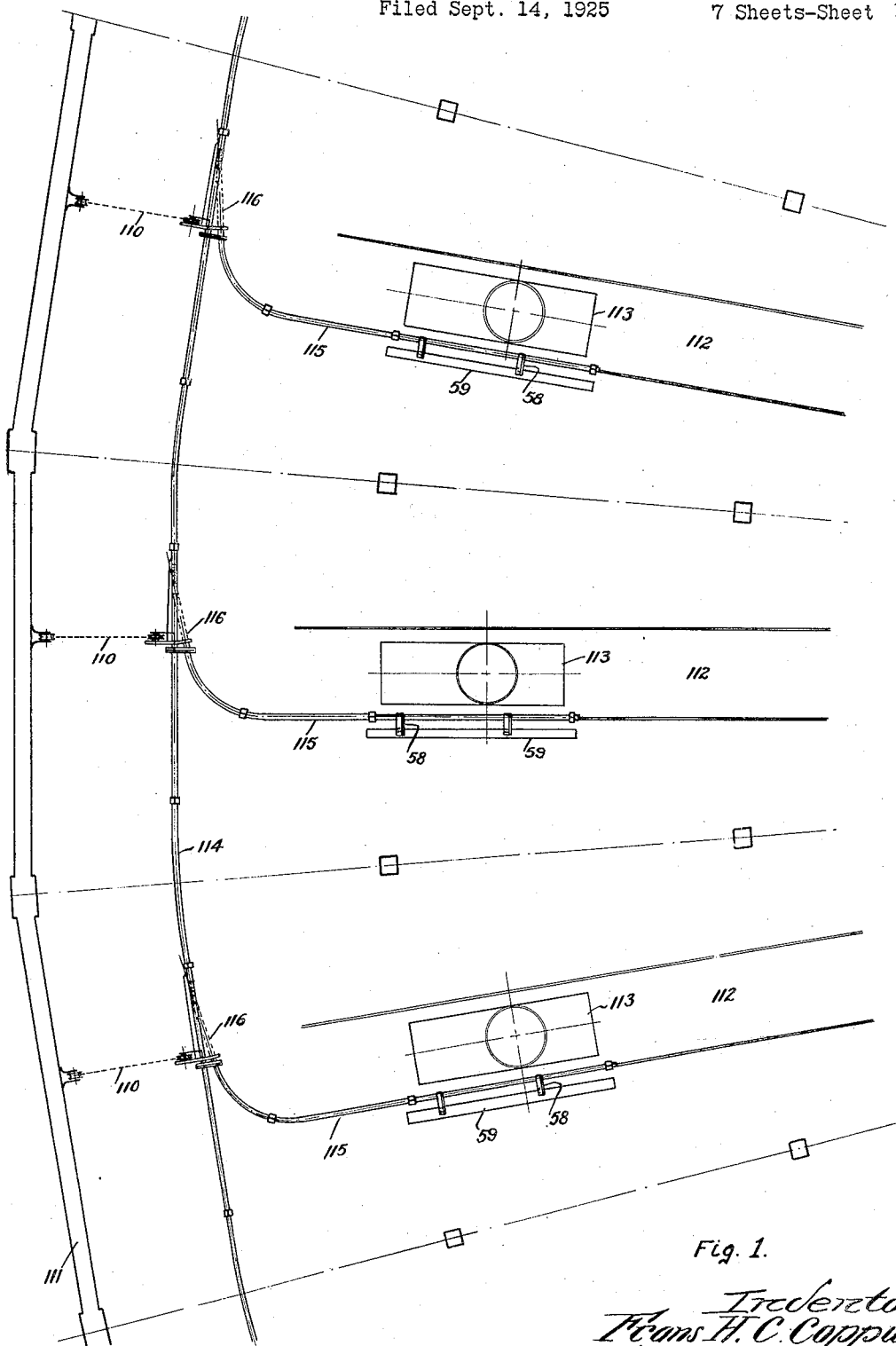
Fig. 1 is a plan view of a part of a roundhouse showing several stalls and illustrating the overhead tracking arranged according to this invention and its relation to the smoke jacks but without illustrating details.

In Fig. 1 I have shown part of a roundhouse having a wall 111 with a monorail system having a number of stalls 112 each with a smoke jack 113 as usual, I-beams 114 constituting the main rail parallel to the wall and there are a series of spurs 115 and two way switches or pivoted track sections 116 of usual construction. These switches are each operated by two chains 110 hanging down. Each spur runs outside the smoke jack out of the path of the gases which rise from the smoke stack when the engine is put under it. This adds to the durability of the rails as they are not in the direct path of the corrosive gases.

Each spur 115 has brackets 58 which support a switch box 59. The wires 60 (Fig. 3) of the motor end in contactors 61 which engage with flat conductors 63 of the switch box 59. By means of a chain 62 operating a sprocket connected with gearing 67 a geared trolley 55 is moved along the track carrying the blower. To allow it to pass around the curve and through the two way switch the switch of the trolley is loosely fitted on the opposite flanges of the I-beam. This play may prevent the contactors 61 from engaging properly with the conductors 63. To take this play away the I-beam is provided with a filler 118 within the operating zone so that the opposite converging wheels 119 of the trolley 55 have no side play. This filler 118 has a slant 120 at the entrance point so as to facilitate the proper placing of the trolley.

The blower 50 is carried by trunnions 52 on a fork 51 counterweighted at 57 and supported on a swivel joint 53 by a chain 54 from the trolley 55 so that the blower can be raised and lowered. Chains 56 limit the downward travel of the blower about the pivot, the blower being slightly heavier than the counterweight 57. As soon as the contactors disengage from the wires 63 the motor stops. Therefore, the blower will always be in operation when it is within the normal operating zone, that is, anywhere below the smoke jack, the reason for which will be explained later.

By pulling straight downward on a chain 66 the blower will be raised, and by letting this chain go the blower will be lowered thus taking care of different heights of stacks. By pulling on the chain sideways the blower will describe the arc of a circle, pivoting about the supporting chain 54, thereby allowing the blower to take up any position within this arc and lowering it on the smoke stack of the locomotive whether this is located right in the center of the smoke jack or on either side of it.

Figure 10:
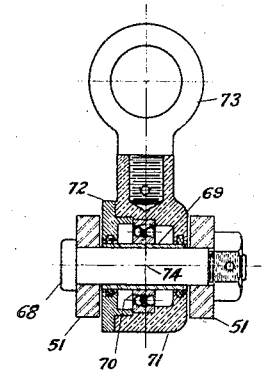
Fig. 10 is a sectional view of the swivel joint through the center thereof and on an enlarged scale.
Figure 8:
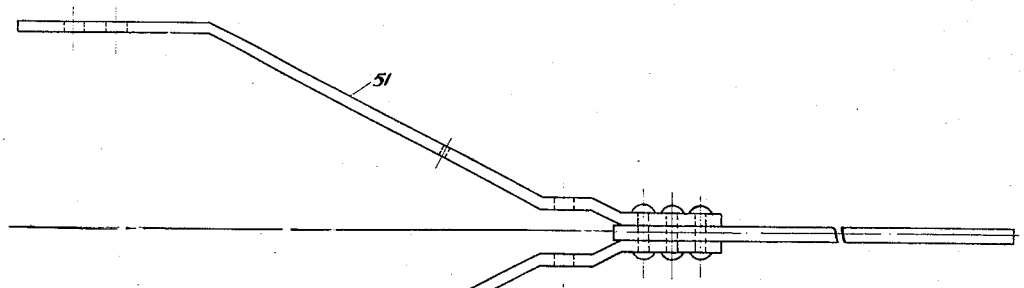
Fig. 8 is a plan of the fork for supporting the blower.
Figure 9:
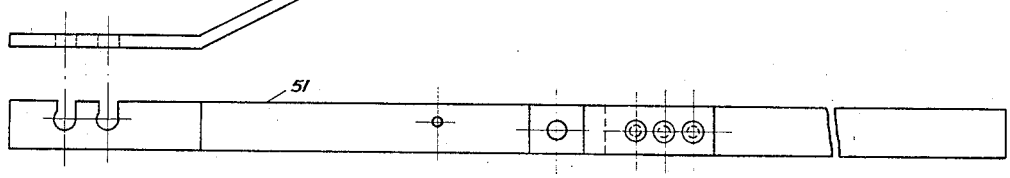
Fig. 9 is a side view of the same.

Through the arms of the supporting fork 51 (Fig. 10) extends the pivot bolt 68 with a bushing 69 on which is mounted the inner race of a self-aligning bearing 70. The outer race of this bearing is located in a housing 71 covered by an enclosure 72. The housing 71 has a vertical eye-bolt 73 to which is fastened the supporting chain 54 so that there is a slight oscillating motion around point 74 in the center of the fork 51. It is necessary that this motion be about this point to enable the relative proportions in the weights of the blower and the counterweight to be maintained. This motion is sufficient to take care of any dis-alignment of the stack so that the blower will rest snugly on the stack regardless of its position even if the locomotive is tilted materially out of its normal upright position.

Figure 7:
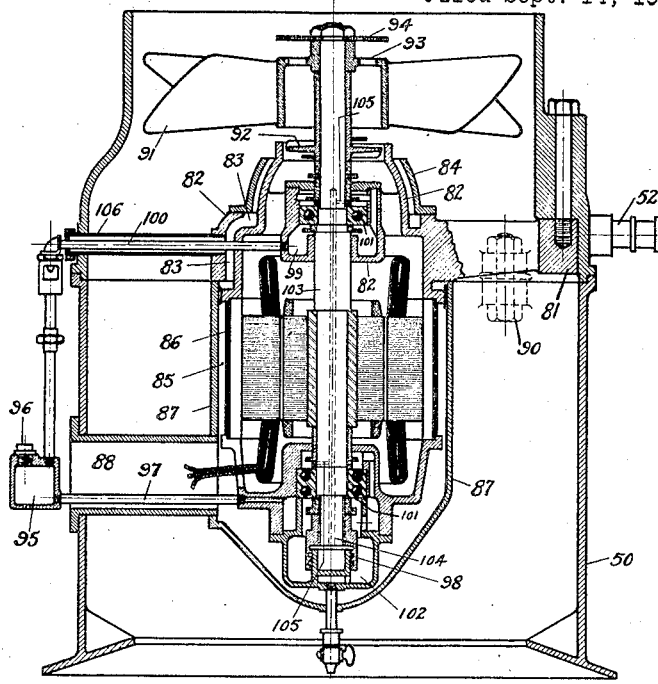
Fig. 7 is a sectional view of the blower on an enlarged scale.

The blower casing 50 (Fig. 7) is formed in two pieces, to the upper of which is bolted a spider 81, the hub 82 of which forms the upper end cap and bearing housing of the motor. This end cap has cored slots 83 and an end shield 84 which forms with the hub 82 a continuation of the cored slots 83. Leading to the cored slots 83 is an annular air chamber 85 formed by the motor housing 86 and motor cover 87 enclosing the entire motor. To this air chamber 85 lead one or more radial pipes 88 from the outside of the lower part of the blower casing 50 which is bolted to the upper part by four bolts 90. The air therefore, passing through the tubes 88, enters the annular air chamber 85, then passes through annular slots 83 into the passage between the housing 82 and the shield 84. The air is drawn through this passageway by the suction created by the fan 91. The air, however, is also drawn through the motor itself by the action of fan 91, assisted by a smaller fan 92 on the same vertical shaft 103 which discharges the air into the hollow hub of the fan 91 and out through holes 93, thereby cooling the inside of the hub so that very little or no heat is transmitted to the shaft by the fan blades. A throw ring 94 prevents any dirt from falling down through the holes 93 or any rain or water of condensation from entering similarly. We have seen that the blower is in motion when in proximity of the stack and will remain in motion until taken out of the operating zone. Therefore, if any steam should be discharged through the stack it cannot reach the motor because of the provisions just described.

This blower has two ball bearings 101, the oiling of which is accomplished as follows: Oil is poured into a receptacle 95 until it overflows through a hole having a plug 96 which is then secured in place. A pipe 97 leads from the receptacle to the oil chamber 102 of the motor and this oil chamber will be filled approximately to the top of the lower ball bearing. A screw nut 98, rotating with the shaft 103, pumps the oil upward through a hole 104 through the center of the shaft, putting the oil in this hole under pressure. Above each ball bearing is an outlet 105 from this hole and the oil flowing through the lower outlet will pass through the ball bearing and immediately into the oil reservoir, while the oil passing through the upper hole flows through the ball bearing into a chamber 99 then out through a pipe 100 back to receptacle 95. The flow of oil will continue as long as the motor is in operation. The pipe 97 passes through one of the air inlets 88 and therefore is kept cool, and the pipe 100 passes through another pipe 106 which communicates with the air passage 83 for the same purpose. A relief over-flow 107 is provided for the upper bearing.

With this construction, the steam pipes with which roundhouses are ordinarily equipped for the purpose of drafting the locomotives are entirely eliminated. This also eliminates the expense of installation and upkeep of these pipes and their supply from the boilers. Automatic means is provided for shutting off the power whenever it is not required. It is shut off merely by the movement of the blower away from the smoke jack and it is also turned on by the coming of the blower into position under the jack. The blower is held up also, if the locomotive is moved out when nobody is attending to the blower particularly, so that no damage is likely to be done from any inattention of that kind. The portable blower is easily fitted to the stack of the locomotive even if the stack is not centrally located under the jack or if it is tilted to one side. The blower can be carried quickly from one locomotive to another and is provided with means for protecting the motor against the heat of the gases of combustion and steam from the steam jet blower if that is turned on. Automatic means is provided for lubricating the bearings of the blower and means for cooling the motor as it operates. This is a material improvement over the blower systems that have been installed heretofore because the blower is portable and no flexible or telescoping pipes have to be used in connection with it that may be left open, thus wasting power.

Fig. 11 shows a modified layout of the monorail system, in which the spur 125 is hinged at 126 so that the blower may be moved slightly to the left or right to take care of any tilting of the locomotive stack. The free end rests and slides on a horizontal bar 124. In this case the track normally moves directly under the smoke jack 113. This has the disadvantage that the I-beam is in the direct path of the gases of combustion which are highly corrosive. I have shown in Figs. 12 and 13 how the rail 125 can be pivoted on the stud 126. The pivot stud is mounted on a plate 123 secured to the bottom of a stationary rail 127. Overlapping plates 128 and 129 are secured to the tops of the rails 125 and 127.

In this case the rails and trolley may be the same as above described but the blower casing is considerably modified as shown in Figs. 14, 15 and 16. The intake 130, instead of being fixed to the blower casing, telescopes with one or more sections or collars 131. These sections are moved up and down by two chains or ropes 132 running over quadrants 133, one of the quadrants having an arm 134 with a chain 135 to operate it from the floor. Therefore, instead of moving the blower up and down, only the intake is moved up and down and no hoist is necessary. The blower is suspended by a link 136 pivotally depending from the trolley.

In the form shown in Figs. 17 and 18 the blower casing is suspended by chains 8 and a yoke $8^a$ fulcrumed at $8^b$ in a lug $8^c$ of the blower casing. The chains 8 are the load chains of a geared trolley hoist 9, the trolley of which runs over the spur 125 of the monorail system which is suitably supported by hangers. The jack 11 is provided with doors 12 which are pulled open by a chain 13 over a pulley sufficiently to allow the blower to enter the smoke jack. After the blower has entered the smoke jack the doors are allowed to close by their own weight or by suitable springs or counter-weights, not shown, provided for the purpose. The blower has a conical intake 15 which rests on the locomotive stack, the blower being moved up and down by the operating chain 16 of the hoist. By operating the chain 17 of the geared trolley the blower is moved in or out of the jack.

Figs. 19 to 22 show the blower with a screw hoist instead of a chain hoist, as previously described. The blower is suspended from the screw rod 20, fulcrumed at 21 so that it can swing slightly out of its normal position in order to set squarely on the locomotive stack if the locomotive should be tipped to one side. Bracket 22 which is fastened to the blower outlet, has a fork 23, the arms of which are guided by the flat sides of the housing 24 of the screw hoist so that the blower and the hoist rod 25 are prevented from turning around the center of the rod.

The blower itself consists of a housing 30 having an intake elbow 31 provided with a flared inlet 32. To the upper part of the blower housing is bolted a fan casing 33 with a hub 34 containing a bearing bushing 35 through which passes the shaft 36. The bushing 35 is provided with prongs or ribs on the outside so that air passages 37 are formed between the hub 34 and the bushing. The hub 34 is fastened to the casing 33 by means of ribs 34ª and between these ribs are gaps 34ᵇ which are closed by covers and thus constitute air passages. The inlet to the air passages 37 is closed by a pipe 40 and the inlet to the air passages 34ᵇ is closed by a flat plate 41 and a pipe 42. This forms an air passage between the pipes 40 and 42 which communicates with atmosphere outside of the blower. An air passage is also formed between the pipe 40 and the shaft 36 communicating with the passages 37 and opening up to the motor casing. By the action of the fan 38 air is drawn from the outside between the pipes 40 and 42 and also through the motor and around the shaft. At the extreme end of the shaft is the fan 38 discharging the gases into the blower outlet 39.

On the other end of the housing 30 is bolted the motor frame consisting of a cap 43, shell 44, and cap 45, the latter containing the other bearing of the blower. Thus the motor is located out of the path of the heated gases of combustion. The lubrication of this bearing is furnished by an ordinary grease cup screwed into the cover 48 and the grease pipe for the upper bearing is located inside of a sleeve which is screwed into the hub 34 so that there is an air passage between this pipe and the grease pipe for keeping the grease cool. A guard 46 protects the motor.

The casing 30 is provided with two doors 47, one on each side, which, when the blower is not in operation, hang open as indicated, but when the blower is started up a suction is created inside of the blower housing, which automatically closes these doors. These doors are for the purpose of letting cold air into the blower housing if the blower should be allowed to remain on a stack not in operation, thereby reducing the temperature of the gases and consequently the heat to which the bearing 55 is subjected. The motor is provided with long wires for plugging in the motor at a convenient place for each stall.

Figure 23:
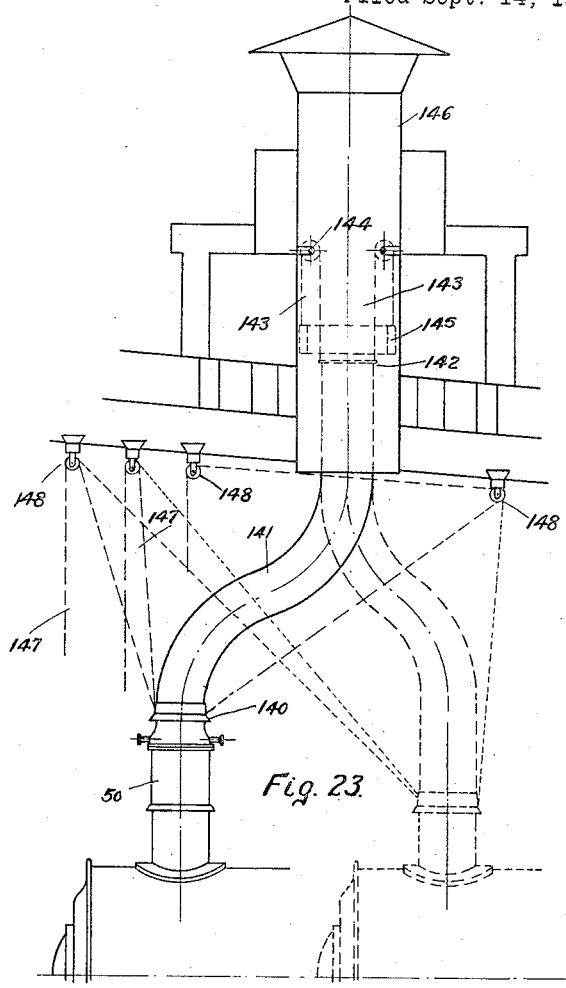
Figs. 23 and 24 are side and end views of a modification.
Figure 24:
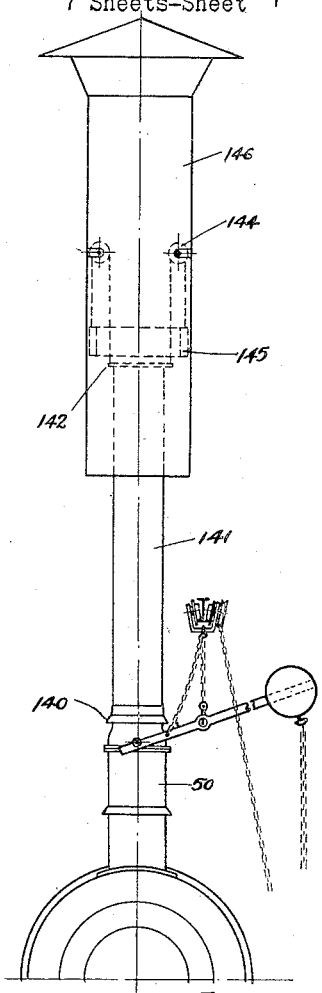
Figure 25:
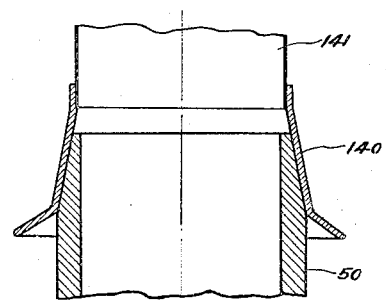
Fig. 25 is an enlarged sectional view of part of the same.

In the form shown in Figs. 23 to 25 the blower 50 supported in the way shown in the first three figures or in any other desired way, is adapted to be inserted in the flaring conical inlet 140 at the bottom of a flexible hose 141 so that the hose can receive the gases drawn up through the blower. The blower has a conical top so as to fit in the conical inlet. The hose 141 can be formed of rubber lined with asbestos or other material to stand the heat of the gases to which it is subjected. Its upper end has an outlet ring 142 which is held up by chains 143 running over pulleys 144 and held up by a counterweight 145 preferably in the form of a ring almost heavy enough to pull up the hose.

The parts just above described are located in the chimney 146 and no smoke jack is required although they can be located in one if desired. On the inlet 140 are attached three or more chains 147 running to pulleys 148 in different directions and hanging down so that they can be operated to move the hose around with the blower on it, or without it, but ordinarily when the blower is on it the blower will be manipulated as in the preferred form shown. The blower can be put on the stack of a locomotive as shown in full lines in Fig. 23 and if the locomotive is drawn back it will go with it, as indicated in dotted lines in that figure. However, it is to be noted that in the dotted line position the blower 15 is missing. This is to show that the inlet 140 can be applied directly to the top of the locomotive stack to direct the gases up in the chimney without a blower at certain times. It will be understood that the counterweight 145 is heavy enough so that by manipulating the inlet 140 the whole hose may be raised and lowered in the chimney. It is adapted to be applied to a locomotive smoke stack with the blower between whenever the locomotive is approximately under the chimney and no matter how much it is tilted to one side.

Figure 26:
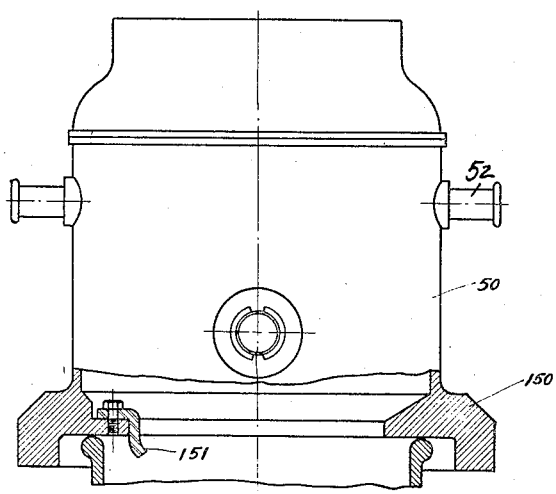
Fig. 26 is a side view of a modified blower.

In the form shown in Fig. 26, the blower 50 is provided with a weighted ring 150 at the bottom and it is otherwise constructed as shown in the first form of the invention illustrated. Its trunnions are employed to allow it to be picked up by an ordinary crane which can set it around wherever desired on a locomotive. In this case, the locomotive being placed under a steam jack as before described, the crane will move around and place the blower on the stack of the locomotive and it will be held there by clips 151 so that it will not be dislodged accidentally. The blower will be connected with the electric supply in any desired way and will discharge the gaseous products of combustion up the smoke jack or chimney. When the operation is finished, the crane will be employed to move it away. This heavy ring 150 is employed to keep the blower right side up and to insure its hanging down straight from the crane and furnishes also a limit at the bottom to keep it from sliding about on top of a locomotive smoke stack.

The specific blower mechanism and the modified forms are not claimed herein in detail as they constitute the subject matter of two divisional applications.

Although I have illustrated and described several forms of the invention, I am aware of the fact that modifications can be made therein by any person skilled in the art without departing from the scope of the invention as expressed in the claims. Therefore I do not wish to be limited in these respects but what I do claim is:—

1. In a locomotive drafting plant, the combination with a plurality of smoke jacks, of a blower adapted to be applied to and removed from the stack of a locomotive for drafting the same, and means for movably supporting the blower above the level of the locomotive smoke stacks so that it can be moved around to positions under the different jacks to draft a number of locomotives in different positions, one at a time.

2. The combination with a locomotive round-house, of a blower adapted to be bodily applied to and removed from the stack of a locomotive for drafting the same, and means for moving the blower around to the different stalls of the roundhouse to draft a number of locomotives in different positions, one at a time.

3. The combination with a locomotive roundhouse having smoke jacks, of a blower adapted to be applied to and removed from the stack of a locomotive for drafting the same, means for moving the blower around to the different stalls of the roundhouse to draft a number of locomotives in different positions one at a time, and means for mounting the blower flexibly so that it will be capable of application to register with the top of the stack if the locomotive is tilted or otherwise out of position and also register with the bottom of the jack.

4. In a locomotive drafting device, the combination with a smoke jack, of a movable support, a blower depending from said support, and means for adjusting the blower to a position on the stack of a locomotive under the jack regardless of the registration of the locomotive smoke stack with the center of the jack either sideways or longitudinally.

5. In a locomotive roundhouse, the combination with a series of stalls provided with smoke jacks over the tracks of the roundhouse, of a blower movable adjacent to the smoke jacks and into position below the same to discharge the gases of combustion into the smoke jacks from the locomotive, and supporting means for the blower adapted to hold the blower up when it has been applied to a locomotive stack if the locomotive is moved out of position under the jack.

6. In a locomotive roundhouse, the combination with the stalls thereof, of a main track, a series of spurs extending inwardly from the main track in the several stalls of the roundhouse, switches connecting the spurs with the main track, and a portable blower supported by and movable along the track and also movable on said switches to the spurs.

7. In a locomotive roundhouse, the combination with the external wall thereof, a main track extending along the wall and spaced inside it, a series of spurs extending inwardly from the main track in the several stalls of the roundhouse, a series of switches connecting the spurs with the main track, means for operating the switches to connect any spur with the track, and a portable blower depending from and movable along under the track and also movable on said switches to the spurs, of a smoke jack in each stall alongside of which the several spurs are located.

8. In a locomotive drafting plant, the combination with a main track, a series of spurs extending from the main track, and switches connecting the spurs with the main track, of a portable blower depending from and movable along under the track and also movable on said switches to the spurs, smoke jacks alongside of which the several spurs are located, and means whereby the blower can be moved universally about a center outside the smoke jack to any desired position under the jack.

9. In a locomotive roundhouse, the combination of the external wall thereof, a main track extending along the wall and spaced inside it, a series of spurs extending inwardly from the main track in the several stalls of the roundhouse, a series of switches connecting the spurs with the main track, means for operating the switches to connect any spur with the track, and a portable blower depending from and movable along under the track and also movable on said switches to the spurs, in combination with a smoke jack in each stall alongside of which the several spurs are located, and means whereby the blower on the spurs can be moved universally about a center outside the smoke jack to any desired position under the jack.

10. In a locomotive drafting plant, the combination of a main track, a trolley movable along said track, a series of spurs connected with the track and running radially therefrom, a series of smoke jacks alongside of which the spurs run, means for moving the trolley along the track and spurs, a blower depending from the trolley, and means for automatically connecting the blower with a source of power when the trolley is alongside a jack and for disconnecting the same whenever the trolley is moved out of such position.

11. In a locomotive drafting plant, the combination with a series of spur tracks arranged adjacent to a corresponding number of smoke jacks, of a trolley adapted to run on any of said spurs, a blower depending from the trolley, electrical means for operating the blower, and means whereby the electrical means will be automatically disconnected when the blower moves out of position alongside the jack.

12. In a locomotive drafting plant, the combination with a smoke jack, of a spur track located entirely at one side thereof and out of the path of the combustion gases passing up the smoke jack, a blower supported by said track and movable into a position under the smoke jack and adapted to be adjusted to the stack of a locomotive under the jack, whereby the supporting means for the blower will be out of the path of the gases of combustion or of steam from the locomotive jet blower.

13. In a locomotive drafting plant, the combination with a smoke jack located over the track, of a blower, means located at one side of the jack for adjustably supporting the blower alongside the jack, said means being capable of allowing the blower itself to be moved directly under the jack, and means whereby the blower will be adjusted to fit on smoke stacks of different sizes and kinds.

14. The combination with a smoke jack, of a track arranged adjacent thereto, a trolley on said track, means for moving the trolley along the track, means depending from the trolley and capable of turning on its own vertical axis for supporting a blower comprising a fork, a blower carried in the fork and pivotally connected therewith on a horizontal axis, and means on the fork for counterweighting the blower, whereby the blower can be turned about said axes to bring it into proper relation to the jack and to a locomotive smoke stack beneath.

15. The combination with a smoke jack, of a spur track arranged adjacent thereto, a trolley on said spur, means for moving the trolley along the spur, a fork carried by said trolley and capable of turning on a vertical center, a blower pivotally carried in the fork, means for partially counterweighting the blower, and means for moving the blower up and down about a horizontal axis between the counterweight and blower.

16. The combination with a smoke jack, of a blower for application to a locomotive smoke stack and adapted to direct the gases therefrom up into the jack, means for supporting the blower about the level of the bottom of the jack so as to be capable of tilting about a central horizontal axis, a fork on which the blower is mounted pivoted on a second horizontal axis, movable means for supporting the fork from said axis, a counterweight on the fork having sufficient weight to nearly counterbalance the blower, and means whereby the blower can be raised and lowered about said second axis to adjust it to the smoke stack and to the jack of a locomotive.

17. The combination with a smoke jack, of a blower adapted to direct gases up into the jack, a fork on which the blower is mounted pivoted on a horizontal axis, movable means for supporting the fork from said axis, a counterweight on the fork having sufficient weight to nearly counterbalance the blower, and means whereby the blower can be raised and lowered about said axis to adjust it to the smoke jack and to the stack of a locomotive.

18. The combination with a smoke jack, of a blower adapted to be applied to a locomotive smoke stack to direct the gases therefrom up into the jack, and means for supporting the blower so as to be capable of tilting about a central horizontal axis, and also of being bodily raised or lowered about a horizontal axis beyond the outside of the blower and capable of being turned about a vertical axis adjacent to the second horizontal axis.

19. The combination with a stationary smoke jack, of a blower movable horizontally relatively to the smoke jack, for application to a locomotive smoke stack and adapted to direct the gases therefrom up into the jack, and means for supporting the blower so as to be capable of tilting about a central horizontal axis.

20. The combination with a smoke jack and a track adjacent thereto, of a trolley thereon, a series of conductors arranged adjacent to the track, a series of contactors movable with the trolley for engaging the conductors, a blower carried by the trolley into registration with the smoke jack and means connected with said contactors for operating the blower at all times when the contactors and conductors are in contact.

21. The combination with a track and a smoke jack adjacent thereto, of a trolley thereon, a series of exposed conductors arranged adjacent to the track, a box in which said conductors are located having partitions for separating them, a shaft having a series of contactors thereon for engaging the conductors, said shaft being carried by the trolley and movable therewith, electrical connections from said contactors and conductors by which an electric circuit is completed when the contactors engage the conductors and broken when the engagement ceases, a blower carried by the trolley, and means connected with said contactors for operating the blower at all times when the contactors and conductors are in contact and the blower is in registration with the smoke jack.

22. The combination with a track, of a trolley thereon, a smoke jack adjacent to the track, the track comprising an I-beam having a filler over the web thereof to prevent side play of the wheels of the trolley which are mounted on the lower flanges of the I-beam, said filler having a slant at the end to facilitate the proper placing of the trolley, a blower carried by the trolley, and means for operating the blower when it is in registration with the jack.

23. In a locomotive roundhouse, the combination with the smoke jacks, of a main track, a series of pivoted track sections connected with the main track so that the pivoted sections can be swung about in a horizontal plane, and a portable blower supported by and movable along the track and any of the pivoted sections toward the several jacks.

24. The combination with a smoke jack, of a blower for application to a locomotive smoke stack and adapted to direct the gases therefrom up into the jack, means for supporting the blower at about the level of the bottom of the jack pivotally on a horizontal axis, said blower comprising a casing with an open mouth at the bottom slanting to fit over the top of a smoke stack, a fan at the top of the casing, a vertical central shaft in the casing supporting the fan, and a motor on the shaft within the casing, and means for automatically connecting the motor with and disconnecting it from a source of power in accordance with the position of the blower casing with respect to the smoke jack.

25. The combination with a smoke jack, of a blower for application to a locomotive smoke stack and adapted to direct the gases therefrom up into the jack, a casing with an open mouth at the bottom slanting to fit over the top of a smoke stack, a fan at the top of the casing, a vertical central shaft in the casing supporting the fan, a motor on the shaft within the casing, and means for automatically connecting the motor with and disconnecting it from a source of power in accordance with the position of the blower casing with respect to the smoke jack.

26. The combination with a smoke jack, of a track arranged adjacent thereto, a trolley on said track, means for moving the trolley along the track, a vertical support pivoted to and depending from the trolley and capable of turning on its vertical axis, and a blower pivotally connected on a horizontal axis with said support, whereby the blower can be turned about said vertical axis and swung on the horizontal pivot to bring it into proper relation to the jack and to a locomotive smoke stack beneath.

27. In a locomotive roundhouse, the combination with a smoke jack, of a blower movable adjacent to the smoke jack and into position below the same to discharge the gases of combustion into the smoke jack from the locomotive, and supporting means for the blower adapted to hold the blower up when it has been applied to a locomotive stack if the locomotive is moved out of position under the jack.

28. In a locomotive drafting plant, the combination with a locomotive stack, of a blower movable adjacent to the locomotive smoke box and into position to discharge the gases of combustion from the locomotive, and supporting means for the blower adapted to hold the blower up when it has been applied to a locomotive stack if the locomotive is moved out of position under the blower.

29. In a locomotive drafting plant, the combination with a stall thereof, of a track alongside the stall and a portable blower supported by and movable along the track.

30. In a locomotive roundhouse, the combination with a smoke jack thereof, of a track alongside the smoke jack and a portable blower supported by and movable along the track.

31. In a locomotive drafting plant, the combination of a track, a trolley movable along said track, means for moving the trolley along the track, a blower depending from the trolley and means for automatically connecting the blower with a source of power when the trolley is moved to a certain position on the track, the connection remaining when the trolley is moved beyond this position for a predetermined distance, and for disconnecting the same whenever the trolley is moved out of such position.

32. In a locomotive roundhouse, the combination of a track, a trolley movable along said track, a blower depending from the trolley, a smoke jack alongside of which the track runs, means for moving the trolley along the track, and means for automatically connecting the blower with a source of power when the trolley is alongside the jack and for disconnecting same when the trolley is moved out of such position.

33. In a locomotive drafting plant, the combination with a track adjacent to a smoke jack, of a trolley adapted to run on said track, a blower depending from the trolley, electrical means for operating the blower, and means whereby the electrical means will be automatically disconnected when the blower moves out of position alongside the jack.

34. In a locomotive drafting plant, the combination with a track adjacent to a stall, of a trolley adapted to run on said track, a blower depending from the trolley, electrical means for operating the blower, and means whereby the electrical means will be automatically disconnected when the blower moves out of a certain position alongside the stall.

35. In a locomotive drafting plant, the combination with a stall, of a track located alongside the stall and out of the path of the combustion gases from the smoke stack, a blower supported by said track and movable into a position over the smoke stack and adapted to be adjusted to the stack, whereby the supporting means of the blower will be out of the path of the gases of combustion or of steam from the locomotive jet blower.

36. The combination with a locomotive smoke stack, of a track arranged adjacent to the locomotive, a trolley on said track, means for moving the trolley along the track, means depending from the trolley and capable of turning on a vertical axis for supporting a blower comprising a lever, a blower carried on the lever and pivotally connected therewith on a horizontal axis, and means on the lever for counterweighing the blower, whereby the blower can be turned about said axis to bring it into proper relation to the smoke stack.

37. The combination with a locomotive smoke stack, of a track arranged adjacent to the locomotive, a trolley on said track, means for moving the trolley along the track, a lever carried by said trolley and capable of turning on a vertical center, a blower pivotally carried on the lever, means for partially counterweighing the blower, and means for moving the blower up and down about a horizontal axis between the counterweight and blower.

38. The combination with a locomotive smoke stack of a blower for application to the smoke stack and adapted to direct the gases therefrom, means for supporting the blower capable of tilting about a central horizontal axis, a lever on which the blower is mounted pivoted on a second horizontal axis, movable means for supporting the lever from said axis, a counterweight on the lever, and means whereby the blower can be raised and lowered about the said second axis to adjust it to the smoke stack of a locomotive.

39. The combination with a locomotive smoke stack, of a blower adapted to direct gases therefrom, a lever on which the blower is mounted pivoted on a horizontal axis, movable means for supporting the lever from said axis, a counterweight on the lever, and means whereby the blower can be raised and lowered about said axis to adjust it to the smoke stack of a locomotive.

40. In a locomotive drafting plant, the combination of a blower adapted to be applied to a locomotive smoke stack to direct the gases therefrom, and means for supporting the blower so as to be capable of tilting about a central horizontal axis, and also of being bodily raised or lowered about the horizontal axis beyond the outside of the blower and capable of being turned about a vertical axis adjacent to the second horizontal axis.

41. In a locomotive drafting plant, the combination of a blower for application to a locomotive smoke stack and adapted to direct the gases therefrom, and means for supporting the blower so as to be capable of tilting about a central horizontal axis.

42. In a locomotive drafting plant, the combination of a blower adapted to be bodily applied to and removed from the stack of a locomotive for drafting the same, and supporting means for the blower adapted to hold the blower up when it has been applied to a locomotive stack if the locomotive is moved from under the blower.

43. In a locomotive drafting plant, the combination with a locomotive smoke stack, of a blower, means for adjustably supporting the blower alongside the locomotive, said means being capable of allowing the blower itself to be moved over the stack, and means whereby the blower will be adjusted to fit on smoke stacks of different sizes and kinds.

44. In a locomotive drafting plant, a blower adapted to be bodily applied to and removed from the stack of a locomotive for drafting the same.

45. In a locomotive drafting plant, the combination of a blower adapted to be bodily applied to and removed from the stack of a locomotive for drafting the same, and means for mounting the blower flexibly so it will be capable of application to register with the top of the stack if the locomotive is tilted or otherwise out of position.

46. In a locomotive drafting plant, the combination of a blower adapted to be bodily applied to and removed from the stack of a locomotive for drafting the same, and means for mounting the blower flexibly so it will be capable of application to register with the top of the stack if the locomotive is tilted or otherwise out of position, and also register with the bottom of the jack.

47. In a locomotive drafting device, the combination with a stall, of a movable support, a blower depending from said support, and means for adjusting the blower to a position on the stack of a' locomotive in the stall regardless of the registration of the locomotive smoke stack with the center of the stall.

48. The combination with the front end of a locomotive and a track adjacent thereto, of a trolley thereon, a series of conductors arranged adjacent to the track, a series of contactors movable with the trolley for engaging the conductors, a blower carried by the trolley, and means connected with said contactors for operating the blower at all times when the contactors and conductors are in contact.

49. In a locomotive drafting plant, the combination of a blower adapted to be bodily applied to and removed from the stack of a locomotive for drafting the same, and means whereby the blower will be adjusted to fit on smoke stacks of different sizes and kinds.

50. In a locomotive drafting plant, the combination of a blower adapted to be bodily applied to and removed from the stack of a locomotive for drafting the same, means for mounting the blower flexibly so it will be capable of application to register with the top of the stack if the locomotive is tilted or otherwise out of position, and means whereby the blower will be adjusted to fit on smoke stacks of different sizes and kinds.

51. In a locomotive roundhouse, the combination of a blower adapted to be bodily applied to and removed from the stack of a locomotive for drafting the same, means for mounting the blower flexibly so it will be capable of application to register with the top of the stack if the locomotive is tilted or otherwise out of position, and also to register with the bottom of the jack, and means whereby the blower will be adjusted to fit on smoke stacks of different sizes and kinds.

52. In a locomotive drafting device, the combination with a stall, of a movable support, a blower depending from said support, and means for adjusting the blower to a position on the stack of a locomotive in the stall regardless of the longitudinal position of the locomotive in the stall.

53. In a locomotive drafting plant, the combination of a blower adapted to be bodily applied to and removed from the stack of a locomotive for drafting the same and supporting means for the blower adapted to hold the blower up when it has been applied to a locomotive stack if the locomotive is moved out from under the blower.

54. In a locomotive drafting plant, the combination with a stall thereof, of a track alongside the stall, and a portable blower adapted to be bodily applied to and removed from the stack of a locomotive in the stall for drafting the same and supported by and movable along the track.

55. In a locomotive roundhouse, the combination with a smoke jack thereof, of a track alongside the smoke jack and a portable blower adapted to be bodily applied to and removed from the stack of a locomotive under the smoke jack for drafting the same and supported and movable along the track.

56. In a locomotive drafting plant, the combination with a stall thereof, of a track alongside the stall and a portable blower supported by and movable along the track, and means whereby the blower can be moved universally to any desired position over the stall.

57. In a locomotive roundhouse, the combination with a smoke jack thereof, of a track alongside the smoke jack and a portable blower supported by and movable along the track, and means whereby the blower can be moved universally about a center outside of the smoke jack to any desired position under the jack.

58. The combination with the front end of a locomotive and a track adjacent thereto, of a trolley thereon, means on the track to prevent side play of the wheels of the trolley, a blower carried by the trolley, and means for operating the blower.

59. The combination with a locomotive smoke stack, of a blower adapted to direct the gases therefrom, means for supporting the blower pivotally on a horizontal axis, said blower. comprising a casing with an open mouth at the bottom slanting to fit over the top of the smoke stack, a fan in the casing, a vertical shaft supporting the fan, a motor on the shaft within the casing, and means for automatically connecting the motor with and disconnecting it from a source of power in accordance with a predetermined position of the blower with respect to the smoke stack.

60. The combination with a locomotive smoke stack, of a blower adapted to direct the gases therefrom, said blower comprising a casing with an open mouth at the bottom slanting to fit over the top of the smoke stack, a fan in the casing, a vertical shaft supporting the fan, a motor on the shaft within the casing, and means for automatically connecting the motor with and disconnecting it from a source of power in accordance with a predetermined position of the blower with respect to the smoke stack.

61. The combination with the front end of a locomotive having a smoke stack and a track adjacent thereto, of a trolley thereon, means on the track to prevent side play of the wheels of the trolley, a blower carried by the trolley, means for operating the blower, and means for automatically connecting said operating means with and disconnecting it from a source of power in accordance with a predetermined position of the blower with respect to the smoke stack.

62. In a locomotive drafting plant, the combination of a blower for application to a locomotive smoke stack and adapted to direct the gases therefrom, and means for supporting the blower so as to be capable of tilting about a horizontal axis.

In testimony whereof I have hereunto affixed my signature.

FRANS H. C. COPPUS.